United States Patent [19]
Lowther

[11] 3,798,457
[45] Mar. 19, 1974

[54] CORONA REACTOR APPARATUS
[75] Inventor: Frank E. Lowther, Phelps, N.Y.
[73] Assignee: W. R. Grace & Co., New York, N.Y.
[22] Filed: June 4, 1969
[21] Appl. No.: 830,248

[52] U.S. Cl............................... 250/532, 250/537
[51] Int. Cl............................................ C01b 13/12
[58] Field of Search ........................... 204/312–322, 204/176; 250/532–541

[56] References Cited
UNITED STATES PATENTS

| 807,964 | 12/1905 | Rice | 204/319 |
|---|---|---|---|
| 1,403,759 | 1/1922 | Fitzpatrick | 204/322 |
| 1,531,196 | 3/1925 | Kuhlenschmidt | 204/320 |
| 2,128,455 | 8/1938 | Darling | 204/313 |
| 2,345,798 | 4/1944 | Daily | 204/318 |
| 3,575,827 | 4/1971 | Johnson | 204/245 X |
| 1,994,462 | 3/1935 | Bueno | 204/314 |
| 2,309,616 | 1/1943 | Bagby et al. | 204/317 |
| 2,660,559 | 11/1953 | Prime | 204/314 X |

OTHER PUBLICATIONS

Ozone Chemistry and Technology, 1959, pp. 444–445.

Ozone – Its Manufacture, Properties & Uses, A. Vosmaer, 1916, p. 84.

Primary Examiner—T. M. Tufariello
Attorney, Agent, or Firm—Schover & Boston

[57] ABSTRACT

An improved corona reactor method and apparatus for subjecting a fluid reactant to a corona discharge, and particularly for generating ozone. The corona reactor includes a housing containing an air-cooled, modular, corona reactor core comprising a plurality of separate, individually removable, air-tight corona reactor cells. Each corona reactor cell includes two, spaced-apart, metallic electrodes or shell portions defining an air-tight corona discharge chamber therebetween. The exterior surfaces of the electrodes are bare and exposed to ambient; the interior (facing) surfaces are covered with a ceramic discharge dielectric; and the fluid reactant is subjected to the corona discharge within the corona discharge chamber by appropriate inlet and outlet ports. The individual cells are electrically connected in series.

22 Claims, 12 Drawing Figures

INVENTOR
FRANK E. LOWTHER
BY Thomson & Achorn
ATTORNEY

INVENTOR.
FRANK E. LOWTHER
BY Thomson & Schoun
ATTORNEY

INVENTOR.
FRANK E. LOWTHER 3,798,457

CORONA REACTOR APPARATUS

BACKGROUND OF THE INVENTION

1. Field of the Invention

This invention relates to the field of corona reactors and in a preferred embodiment thereof to an ozone generator capable of being subjected to fluid pressures greater than atmospheric.

2. Description of the Prior Art

Corona reactors and ozone generators for delivering ozone under pressure are known. The prior art, however, requires the use of a large pressure vessel, capable of withstanding large forces to house a reactor core, which core may be one or a matrix of tubes or plates. The prior art also requires the need for water cooling of the individual cells, if appreciable amounts of ozone are to be obtained. Both of the prior requirements have been eliminated by the present invention.

Further, prior art constructions do not lend themselves to compact and easily maintained generator designs.

Another disadvantage in the prior art is the fact that the known tubular or parallel plate ozone generator is electrically connected in parallel. The parallel electrical mode of connection requires extremely accurate tolerances on all surfaces and spacers, which accuracy is difficult and expensive to achieve. If all of the air gaps between adjacent electrodes are not absolutely uniform, and if all of the dielectric layers are not identical in all respects, then some air gaps (corona reaction chambers) will be driven harder (electrically) than the others. The narrowest air gap will be driven the hardest and/or the air gap with the thinnest dielectric will be driven the hardest. This disadvantage is a limiting factor in the construction and operation of prior art corona generators, because the corona generator can only be driven (electrically) so hard before the dielectric will become punctured (and thus rendered useless) by a hot arc between the two adjacent electrodes. Thus, in the prior art structure, no more than one gap can be electrically driven the maximum amount.

SUMMARY OF THE INVENTION

This invention comprises a method and apparatus for subjecting a fluid reactant under pressure to a corona discharge, and in the preferred embodiment, to the generation of ozone. The corona reactor of the present invention includes an air-cooled corona reactor core comprising a plurality of individual corona reactor cells arranged in a modular, configuration permitting the adding, replacing, and/or removing of individual corona reactor cells in a fast and simple manner. Each individual corona reactor cell of the present invention has its own air-tight corona reaction chamber which eliminates the need for a large pressure vessel.

Each corona reactor cell is so constructed that the bare metallic exterior surfaces of the cell electrodes are exposed to ambient, and the dielecter layers are in intimate contact with the interior surfaces of the cell electrodes which permits large quantities of ozone to be generated without the need for water cooling.

The present invention includes connecting the individual corona reactor cells in series circuit; this eliminates the above-discussed disadvantages of the prior art parallel circuit mode of connection. Further, by using a relatively high frequency electrical power input to the corona reactor, the same or greater reaction product yield can be achieved with a much lower voltage.

A heat sink is preferably provided between each corona reactor cell, and it provides several functions; it is a structural stiffener for the core permitting the use of thin, metallic cell electrodes; it is the electrical connection between adjacent electrodes of adjacent corona reactor cells; it provides convenient air passages for air-cooling the corona reactor core; it provides increased cooling surfaces in heat transfer relationship with the exterior metal surfaces of each cell; and it provides passageways for the fluid reactant inlet tube and the fluid reaction product outlet tube for each corona reactor cell permitting the use of a smaller core.

The invention also includes several means for preventing arcing between the two electrodes of each corona reactor cell, at the margins or edges of the cell.

BRIEF DESCRIPTION OF THE DRAWINGS

The present invention will be more fully understood by reference to the following detailed description thereof, when read in conjunction with the attached drawings, wherein like reference numerals refer to like elements and in which.

DETAILED DESCRIPTION OF THE PREFERRED EMBODIMENTS

THE CORONA REACTOR 10

Figure 1:
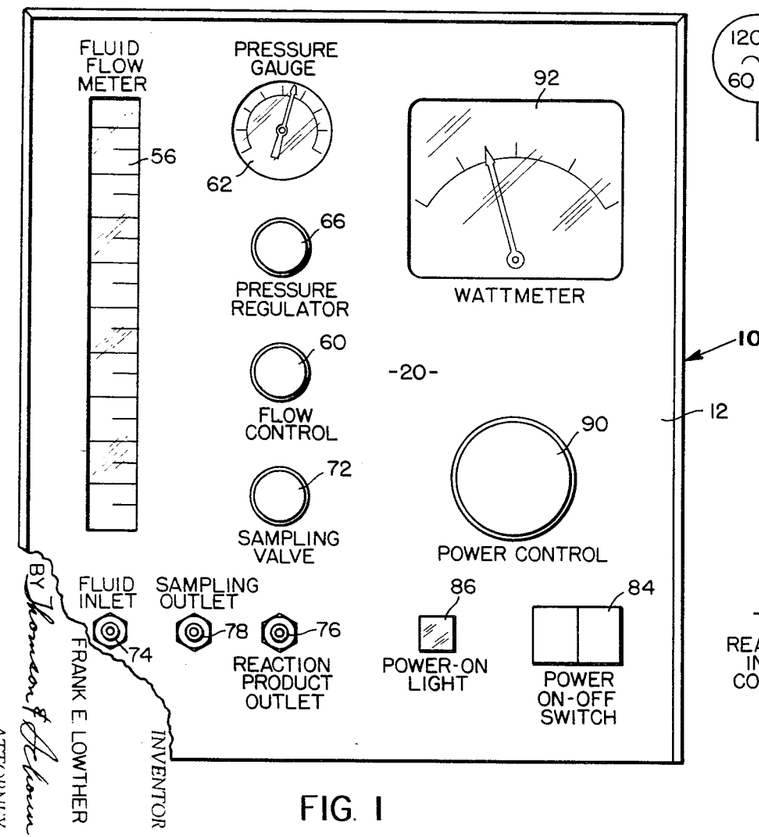
FIG. 1 is a front elevation of the corona reactor 10 showing the control panel 20 thereof.
Figure 2:
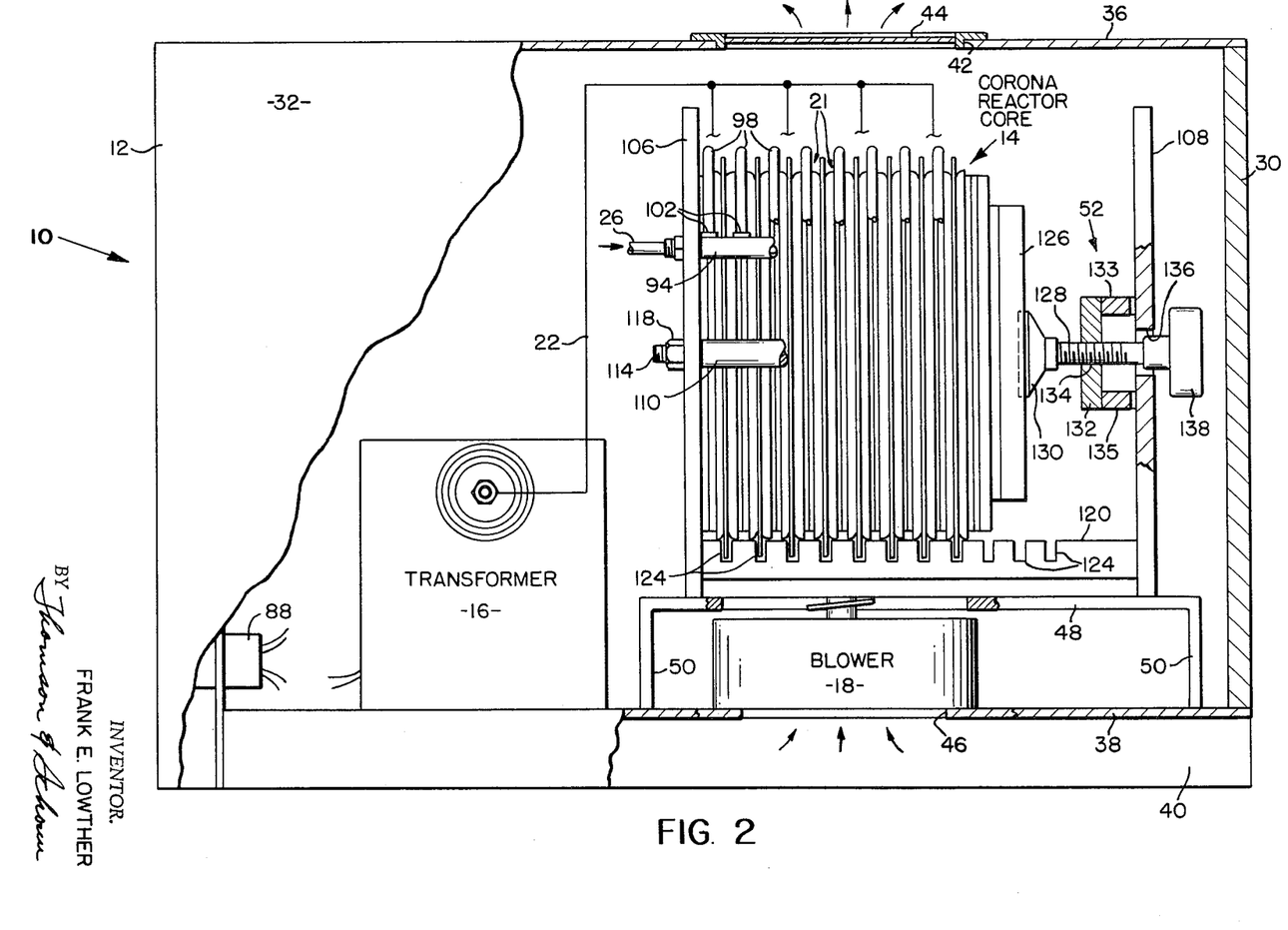
FIG. 2 is a partly broken-away side view of the corona reactor 10 of FIG. 1.
Figure 3:
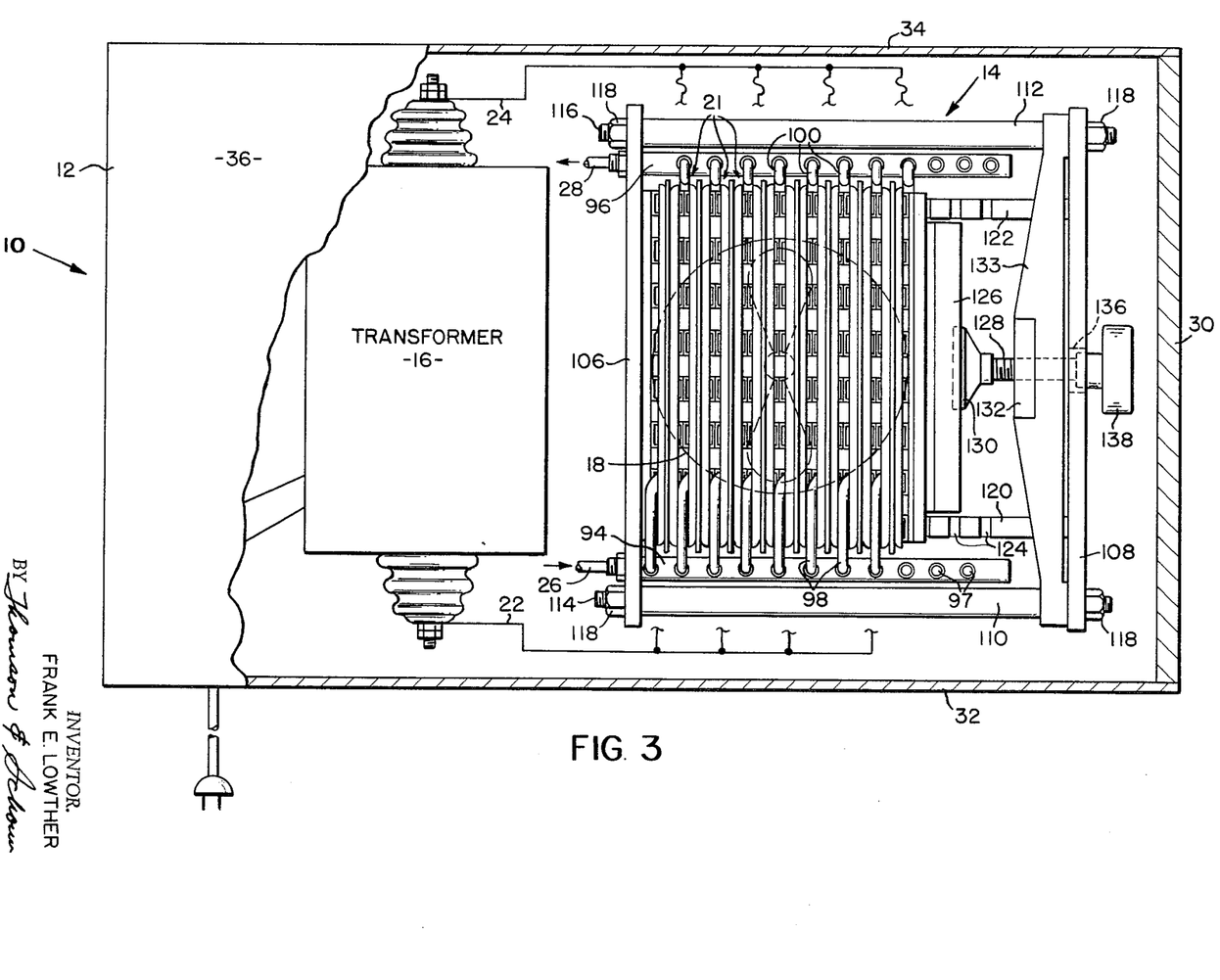
FIG. 3 is a partly broken-away plan view of the corona reactor 10 of FIG. 1.

Referring to FIGS. 1–6 for a description of the overall arrangement of parts of the present invention, FIGS. 1–3 show a corona reactor 10 of the present invention comprising: a housing 12 containing a corona reactor core 14, a transformer 16, a blower 18, and having a front control panel 20. The corona reactor core 14 is made up of a plurality of individual, separately removable, air-tight corona reactor cells 21.

The heart of the present invention is in the corona reactor core 14 and corona reactor cells 21, described in detail below under the heading "The Corona Reactor Core" and "The Corona Reactor Cell" respectively. For the present, it will be sufficient to state that:

1. electric power is supplied to the corona reactor core 14 from the transformer 16 by electrical lead lines 22 and 24;
2. a fluid reactant (when used as an ozone generator, it would be air, oxygen, or an oxygen-containing fluid) is supplied to the corona reactor core 14 from a source through inlet conduit 26;
3. a fluid reaction product is removed from the corona reactor core 14 by an outlet conduit 28; and
4. the corona reactor core 14 is air-cooled by the blower 18.

The Housing 12

The housing 12 comprises the front control panel 20, a rear wall 30, a pair of side walls 32 and 34, a cover 36, and a floor 38 spaced above the surface upon which the corona reactor 10 is supported by legs 40. The cover 36 is made easily removable, by means of screws (not shown) or other known type of connecting means, to provide a convenient means of access to the interior of the housing 12, especially for the addition and/or removal of individual corona reactor cells 21 to the core 14. The cover includes an air exhaust opening 42, above the corona reactor core 14, covered by a wire screen 44. The floor 38 includes an air inlet opening 46 below the blower 18.

The housing includes a sub-floor 48 spaced by means of legs 50 a sufficient distance above the floor 38 to accommodate the blower 18. The sub-floor 48 supports the corona reactor core 14 including a clamp device 52 (of a quick connect-disconnect type to be described below) for securing the individual corona reactor cells 21 together in a modular arrangement.

The Control Panel 20

Figure 4:
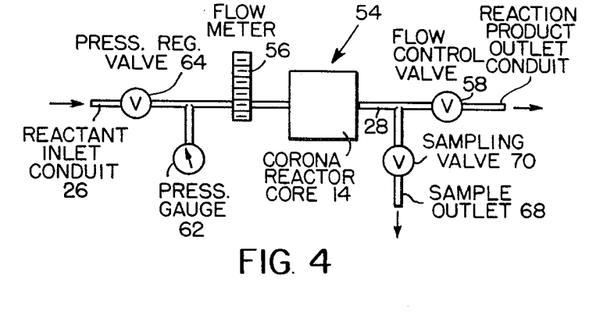
FIG. 4 is a schematic flow diagram for the fluid reactant flow.
Figure 5:
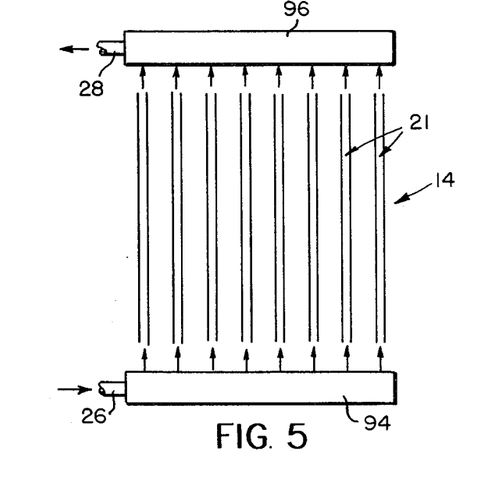
FIG. 5 is a simplified, schematic flow diagram showing the reactant flow into, through, and the reaction product flow out of, the corona reactor core 14 of the present invention.
Figure 6:
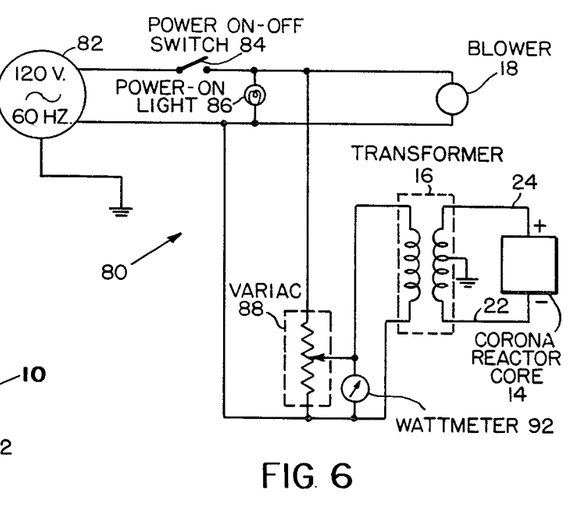
FIG. 6 is an electrical schematic circuit diagram of the power supply of the present invention.

Referring now to FIGS. 1, 4 and 6, a fluid conduit and control system 54 (FIG. 4) includes the inlet and outlet conduits 26 and 28 connected to the individual corona reactor cells 21 of the corona reactor core 14. The flow rate into, through and out of the corona reactor core 14 (see FIGS. 4 and 5) including the conduits 26 and 28, is indicated by a fluid-flow meter 56 on the control panel 20, and is controlled by a flow control valve 58 (FIG. 4) in outlet conduit 28, having a corresponding control knob 60 (FIG. 4) connected thereto and positioned on the control panel 20 and labeled "Flow Control". The fluid-flow meter 56 can be of any standard type, such as those using a vertically movable ball indicating cubic feet per minute of fluid flow.

The pressure of the fluid in the system 54 is indicated by a pressure gauge 62 on the control panel 20 and can be controlled by a pressure regulator valve 64 (FIG. 4) in inlet conduit 26 and having a corresponding pressure control knob 66 (FIG. 1) connected thereto and positioned on the control panel 20 and labeled "Pressure Regulator".

A convenient feature of the present invention is the provision of a sampling fluid outlet conduit 68 (FIG. 4) connected to outlet conduit 28. A sampling valve 70 (FIG. 4) is connected in sampling outlet conduit 68 and is connected to a corresponding sampling valve control knob 72 (FIG. 1) on the control panel 20 labeled "Sampling Valve".

With reference to FIG. 1, fluid connection can be made to the above-described three fluid conduits 26, 28 and 66 of the fluid conduit system 54 directly on the front panel 20 as follows. An inlet connector 74 positioned on the lower left-hand portion of control panel 20, is connected to the end of inlet conduit 26; an outlet connector 76 on control panel 20 is connected to the end of outlet conduit 28; and a sampling connector 78 is connected to the end of the sampling conduit 68.

Referring now to FIGS. 1 and 6, the electrical power supply circuit 80 of the present invention includes a power source 82 of, for example, 120 volt and 60 Hz, connected to the corona reactor core 14 through the transformer 16. A power ON-OFF switch 84 is connected in the circuit 80 and is positioned on the control panel 20. A power-on light 86 is connected in the circuit 80 and is positioned on the control panel 20 adjacent the switch 84. The light 86 is energized when switch 84 is closed and indicates visually when the power is on. As shown in FIG. 6, the closing of switch 84 also energizes the blower 18.

The power applied to the corona reactor core 14 is controlled by a variac 88 connected to a power control knob 90 located on the control panel 20 and labeled "Power Control". The amount of power supplied to the corona reactor core 14 is indicated by a watt meter 92 located on the control panel 20.

The Corona Reactor Core 14

Referring to FIGS. 2 and 3, the corona reactor core 14 comprises a plurality of individual corona reactor cells 21 held together in the clamp 52. The individual corona reactor cells 21 will be described in detail below with reference to FIGS. 7–9.

The corona reactor core 14 is electrically connected to transformer 16 by means of the pair of electrical lead lines 22 and 24. The various modes of electrically connecting the individual corona reactor cells 21 will be discussed in detail below under the heading THE ELECTRICAL CIRCUITS.

The fluid connections to the corona reactor core 14 are as follows. The inlet conduit 26 is connected to an inlet manifold 94 (FIGS. 2 and 3) on one side of the corona reactor core 14. The outlet conduit 28 is connected to an outlet manifold 96 (FIG. 3) located on the opposite side of the corona reactor core 14. As will be described in more detail below, each of the corona reactor cells 21 have an inlet tube 98 connected to the inlet manifold 94 and an outlet tube 100 connected to the outlet manifold 96. The tubes 98 and 100 are connected to the manifolds 94 and 96 by means of connectors 102 (FIGS. 2 and 7), of any known, suitable type. The connectors 102 are preferably of a quick connect-disconnect type. Since the number of cells 21 in any core 14 can vary, the inlet and outlet manifolds 94 and 96 respectively may have openings 104 (see FIG. 7) that are not being used; in such case, plugs 97 (FIG. 3) are connected to openings 104 to close them.

Referring to FIGS. 2 and 3, the clamp 52 includes a pair of stationary, vertical end plates 106 and 108 supported on the sub-floor 48 and held a predetermined distance apart by a pair of spacer tubes 100 and 112 and a pair of bolts 114 and 116, respectively, passing through the spacer tubes 110 and 112 respectively; the bolts are secured by means of nuts 118. A pair of horizontal support bars 120 and 122 are connected between the vertical end plates 106 and 108. The corona reactor core 14 sits directly on top of the horizontal support bars 120 and 122 (a spacer gasket 162, of each of the individual cells 21 extends into vertical slots 124 (FIG. 2) in each of the horizontal support bars 120 and 122 respectively).

The individual corona reactor cells 21 are vertically oriented and are horizontally stacked or pressed together by means of clamp 52 and are easily and separately removable from the corona reactor 10 by simply removing the cover 36 of the housing 12 and releasing the clamp 52. The individual corona reactor cells 21 are supported on the horizontal support bars 120 and 122 between the end plate 106 and a horizontally movable, vertical pressure plate 126. Pressure plate 126 is movable toward and away from the corona reactor core 14 by means of an externally screw-threaded shaft 128 (rotatably connected at a joint 130 to the pressure plate 126 and connected in screw-threaded relationship to end plate 108). A plate 132 connected, by a pair of supports 133 and 135, to end plate 108, is provided with a central, internally screw-threaded opening 134 in which the shaft 128 is matingly threaded for rotation. The end plate 108 is provided with an opening 136 to accomodate a knob 138 rigidly connected to the shaft 128. The knob 138 is rotated to apply or release pressure on the corona reactor core 14 through the pressure plate 126. The knob 138 is manually accessible when the cover 36 is off.

THE INDIVIDUAL CORONA REACTOR CELLS 21

Figures 7, 8, 9:
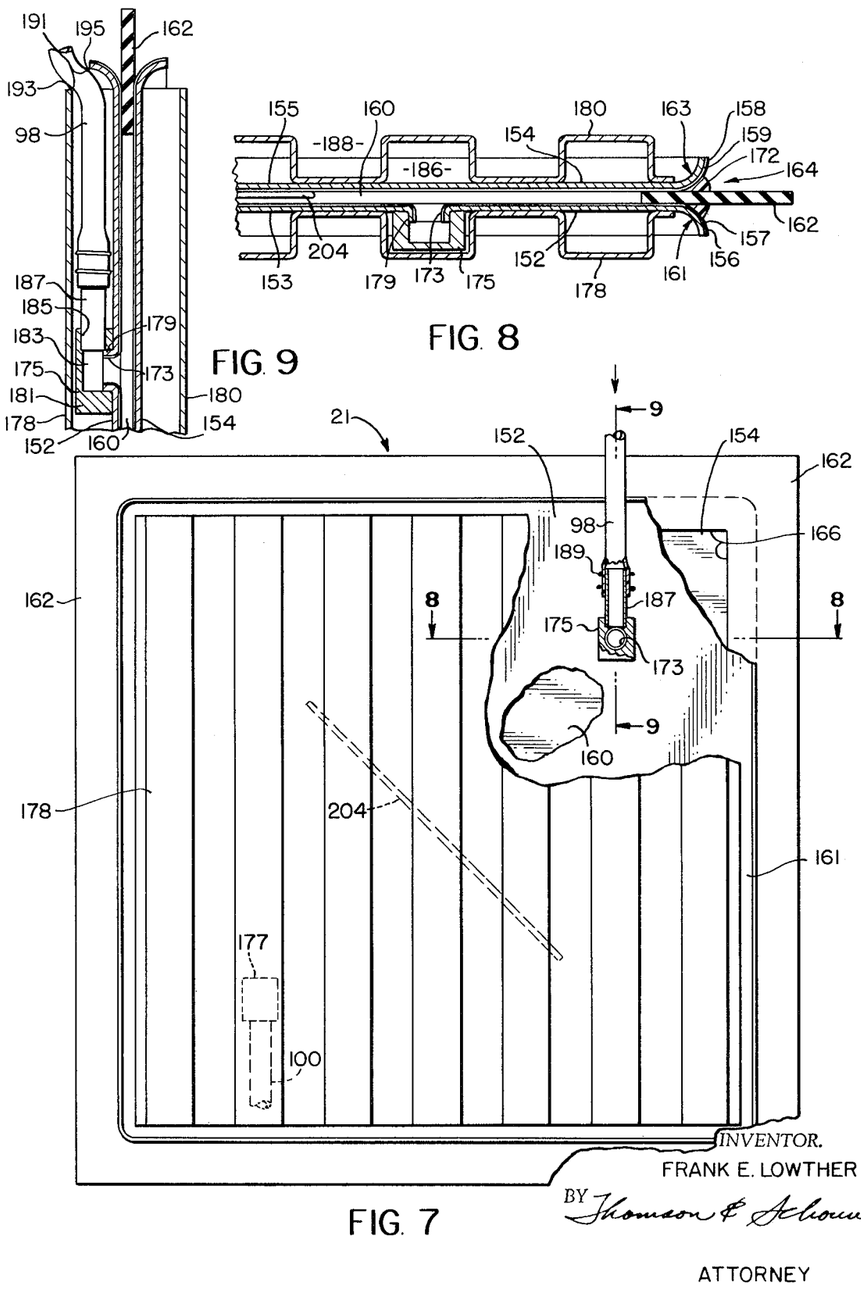
FIG. 7 is a front, plan view partly broken away, of one embodiment of a corona reactor cell of the present invention.
FIG. 8 is an enlarged, partial, horizontal, cross-sectional view through the corona reactor cell of FIG. 7 taken along the line 8—8 of FIG. 7.
FIG. 9 is a vertical, partial, cross-sectional view through the corona reactor cell of FIG. 7, taken along the line 9—9 of FIG. 7.

FIGS. 7-9 illustrate a corona reactor cell 21 comprising a pair of parallel, uniformly spaced-apart electrodes 152 and 154, each having a bare exterior surface 153 and 155, respectively, exposed to ambient. The electrodes have a di-electric coating 156 and 158, respectively, on the interior surfaces 157 and 159 respectively, of the plates 152 and 154. The spaced-apart electrodes 152 and 154 define a corona reaction chamber 160 therebetween. The electrodes 152 and 154 are preferably decarbonized steel and the dielectric coating is a high softening temperature dielectric, preferably a thin layer of ceramic dielectric that is free of voids.

Reference is hereby made to copending patent application Ser. No. 709,485, filed Feb. 29, 1968 and entitled AN IMPROVED METHOD AND CORONA GENERATOR FOR PRODUCING OZONE, for a description of the method and formulas to be used to determine the preferred type and thickness of the dielectric coatings 156 and 158, the width (inter-electrode or gap spacing) of the corona reaction chamber 160, and the applied voltage in the present invention. As stated in the above-referenced application Ser. No. 709,485 the total thickness of both dielectric coatings together is preferably less than 40 mils.

The electrodes 152 and 154 are preferably rectangular and have a turned or flared edge 161 and 163, respectively (see FIGS. 7 and 8) around the entire periphery of the electrodes 152 and 154. The turned edges 161 and 163 are curved away from each other (i.e., away from the adjacent edge of the other of the two electrodes), which permits operation of the corona reactor cell 21 at high voltage without edge sparking. This structure results in the periphery of each of the composite corona reactor cells 21 having a groove 164 (FIG. 8) around the entire periphery thereof, which groove 164 provides for the achievement of a good seal or weld 172 around a spacer gasket 162 (to be described in more detail below).

The two electrodes 152 and 154 are maintained a predetermined distance apart by means of an insulating spacer gasket 162 having a central opening 166 (see FIG. 7), and positioned between the electrodes 152 and 154 around the entire peripheral edge of the cell 21. The spacer gasket 162 is preferably made of silicone rubber; it can be made of any other suitable material. The spacer gasket 162 can be made of metal, preferably highly malleable, as will be described more fully below.

The corona reaction chamber 160 is maintained airtight by sealing the electrodes 152 and 154 air-tight to the spacer gasket 162 by means of, for example, a "weld" or bead 172 of silicone sealant (such as that known as RTV) as shown in FIG. 8. The weld or bead is formed on both sides of the spacer gasket 162 around the entire periphery of the cell 21. The spacer gasket 162 thus performs the functions of defining the predetermined spacing between the electrodes 152 and 154 and rendering the cell 21 air-tight.

The fluid reactant is introduced into and removed from the corona reaction chamber 160 of the cell 21 as follows. As stated above, each cell 21 is provided with an inlet conduit 98 and an outlet conduit 100. The inlet conduit 98 is connected to an inlet port 172 in electrode 152 by means of a connector 175. The outlet conduit 100 is connected to an outlet port (not shown) in the other electrode 154 by means of a connector 177. Since the connectors 175 and 177 are identical, a description of one is sufficient. The connector 175 is welded or otherwise connected to the exterior surface 155 of electrode 152 at the port 173, which port 173 can include peripheral wall 179 extending in a direction away from the chamber 160. The connector 175 includes a metallic body 181 having a first cylindrical passageway 183 extending partway therethrough and accommodating or receiving the peripheral wall 179 (see FIG. 9). The body 181 of the connector 175 includes a second cylindrical passageway 185 perpendicular to the first passageway 183 and in fluid communication with the first passageway 183. A tube 187, preferably of metal is welded or otherwise connected to the body 181 at passageway 185 and extends beyond the body 181 to provide a convenient means of attaching the inlet conduit 98 to the connector 175. The conduit 98 can be slipped over the tube 187 and secured by means of a length of wire 189 twisted onto the conduit 98. The outlet conduit 100 is preferably constructed in the same manner. Both ports 173 (and not shown) can be in the same electrode if desired.

From the above description, it will be seen that each individual corona reactor cell 21 is its own individual pressure vessel, sealed by the spacer gasket 162 and the silicone seal or weld 172 "puttied" around the entire periphery of the cell 21 on both sides of the spacer gasket 162. Silicone rubber spacer gaskets and silicone sealant are preferably used because a corona or ozone will not degrade the silicone rubber and sealant, and the silicone rubber and sealant will not degrade the ozone.

In addition to the above described basic structure of the individual corona reactor cells 21, such cells 21 preferably include certain additional structure as follows. FIGS. 7–9 show a pair of aluminum heat sink spacers 178 and 180 in contact with the exterior surfaces 155 and 157, respectively, of the electrodes 152 and 154. The heat sink spacer 178 (a description of one is sufficient because they are identical) is formed with a corrugated design having a plurality of oppositely opening, parallel channels including closed channels 186 and open channels 188. The heat sink spacers 178 and 180 have several functions. One function of the heat sink spacers 178 and 180 is to act as a heat sink, to remove the heat generated by the corona reactor cell 21 during the corona reaction period. To aid in this function, it is preferred to blow cool air through the corona reactor core 14 in a direction parallel to the channels 186 and 188. This is accomplished by means of blower 18 (see FIG. 2). Thus, as shown in FIG. 3 the corona reactor cells 21 are arranged such that the channels 186 and 188 are oriented vertically so that air entering the corona reactor 10 from the bottom can be blown vertically up through the corona reactor core 14 and out the opening 42 in the housing 12. Another function of the spacers 178 and 180 is to maintain the adjacent corona reactor cells 21 in spaced-apart relationship, when a plurality of such cells 21 are combined to form a corona reactor core 14, and to carry and uniformly distribute the forces resulting from the pressure of the fluid reactant in the reaction chamber 160. The heat sink spacers 178 and 180 also carry and uniformly distribute the forces of the pressure plate 126 throughout the corona reactor core 14.

Being electrically as well as thermally conductive, the spacers 178 and 180 also provide the additional function of providing an electrical connection between adjacent electrodes of adjacent corona reactor cells 21. The spacers 178 and 180 thus provide convenient electrical terminals to which the electrical power can be applied and for electrically connecting the cells 21 together.

In order to form a corona reactor core 14 containing a plurality of corona reactor cells 21, the cells 21 are placed or stacked one against the other as shown in FIGS. 2 and 3, and the electrical and fluid connections made. Regarding FIG. 2 showing the horizontal support bars 120 and 122 having slots 124 therein, the reason for such slots 124 is now clearly seen, i.e., to provide access room for the spacer gaskets 162.

The conduit 98 carrying the fluid reactant into the reaction chamber 160 extends partway through one of the closed channels 186 of the spacer 178 and extends through the space 191 between one edge 193 (FIG. 9) of the spacer 178 and the adjacent edge 195 of the electrode 152. The outlet conduit 100 extends through one of the channels 186 in a similar manner to that just described for the inlet conduit 98.

FIGS. 7–9 show an additional feature of the present invention comprising a silicone baffle 204 to aid in the reaction by preventing the creation of any "dead spaces" in the reaction chamber 160. The baffle 204 is not a complete, imperforate wall extending across the entire width (inter-electrode gap) of the reaction chamber 160, but rather as shown in FIG. 8, merely extends partway across the width of the reaction chamber 160.

Another feature of the present invention is the use of a conductive material, preferably a soft, malleable metal such as aluminum, for use as the spacer gasket 162, in lieu of the non-conductive rubber described heretofore. The use of such metal would provide a high degree of uniformity in the distance separating the two electrodes 152 and 154. To prevent electrical arcing at the margins or edges of electrodes 152 and 154, it may be necessary to prevent the metal spacer from extending out from between the electrodes 152 and 154, beyond about the point where the edges 161 and 163 begin to curve away from each other.

Further, to prevent arcing when using metal spacers, the voltage can be decreased. The same (or even greater) corona intensity can be maintained with a smaller voltage by increasing the frequency, as will be understood by reference to the following equation:

$$P = KV^2 f$$

where:

$K$ is a function of dielectric thickness, dielectric constant, and width of air gap, in accordance with the teachings of the aforementioned copending patent application Ser. No. 709,485, filed Feb. 29, 1968;

$P$ is the power in watts of the corona discharge;

$V$ is the voltage (in volts) applied across the electrodes 152 and 154; and $f$ is the frequency in Hz.

Typically, the frequency according to this aspect of the present invention is in the range of about 100 Hz to 6,000 Hz and the voltage is in the range of about 2,000 to 15,000 volts peak.

The derivation of this equation is described in the aforementioned copending application, Ser. No. 709,485.

As will be discussed more fully below, this feature of increasing the frequency and lowering the voltage to obtain as high or possibly an even higher yield (than that obtainable with the usual higher voltage and lower frequency) is applicable also to the other embodiments; it is not limited to use where the spacer gasket is metal.

THE ELECTRICAL CIRCUITS

Figure 10:
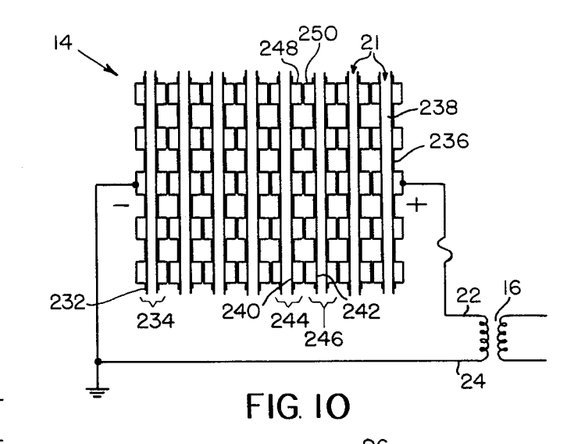
FIG. 10 is an electrical schematic circuit diagram showing the individual corona reactor cells of a corona reactor core connected in series according to the present invention.
Figure 11:
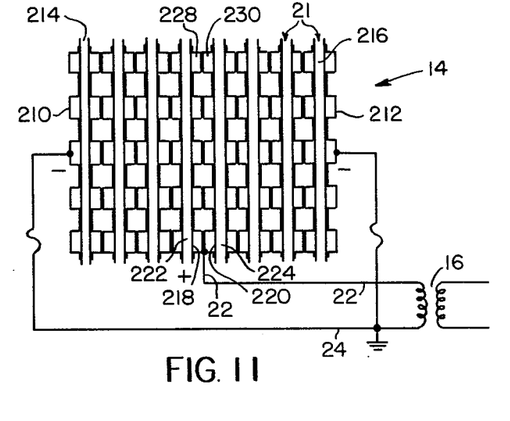
FIG. 11 is an electrical schematic circuit diagram showing the corona reactor cells connected in combination series-parallel.
Figure 12:
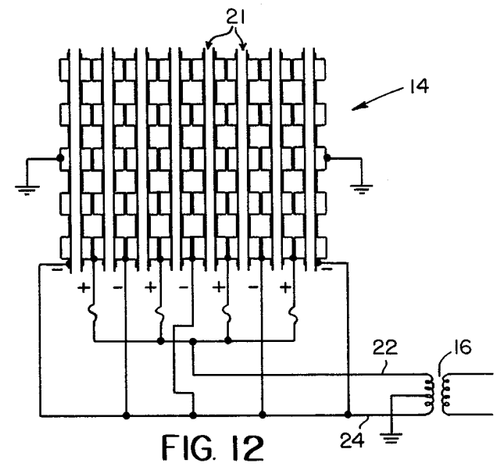
FIG. 12 is an electrical schematic circuit diagram showing the individual corona reactor cells connected in parallel.

Reference will now be made to FIGS. 10–12 for a description of three different voltage driving arrangements of the present invention.

FIG. 10 shows the series connected voltage driving scheme of the present invention which alleviates the above-described disadvantage in the prior art parallel scheme. As shown in FIG. 10, the transformer 16 has one lead connected to a left-hand outside heat sink spacer 232 of the left-hand outside or end cell 234 and the other electrical lead from the transformer 16 is connected to an outside heat sink spacer 236 of the right-hand outside or end cell 238, at the opposite end of the corona reactor core 14. Adjacent plates, (for example plates 240 and 242 of different but adjacent corona reactor cells 244 and 246) are all electrically connected together by virtue of a pair of aluminum heat sink spacers 248 and 250, connected thereto.

In this embodiment, the high voltage applied from the transformer 16 across the entire corona reactor core 14 will preferably be of the order of 30,000–60,000 volts depending upon the use to which the corona reactor 10 is put.

It is found that the individual electrodes of the individual cells 21 act as voltage dividers with the voltage division being governed by the same laws as govern the corona discharge. It has actually been demonstrated that, in a stacked (sandwich) array making up a corona reactor core 14, the corona electrode gap of some (or even one) reactor chambers can be twice the distance of that of the remaining reactor chambers, and yet the corona discharge or intensity will be absolutely uniform throughout every reaction chamber. One reaction chamber was even made wedge-shaped in cross-section with virtually no gap on one edge and a full gap on the opposite edge and a perfectly uniform corona was found to exist therein, with the series electrical mode of FIG. 10 of the present invention.

It is further noted that as the exciting voltage is increased from 0 volts up to the corona discharge start (voltage) point, all reaction chambers start at exactly the same voltage. This is not true with the conventional parallel mode electrical circuit, where the reactor chamber with the smallest gap lights first, the second smallest lights second, etc. The uniformity of corona produced by the present invention greatly facilitates the ease and economy of manufacture.

FIG. 11 shows a combination series and parallel electrical connection wherein a smaller voltage can be employed than is used in the embodiment in FIG. 10 where the voltage is supplied across the entire stack (sandwich) or array of corona reactor cells 21 of the corona reactor core 14. In FIG. 11, one electrical lead 24 from the transformer 16 is connected to the two outside end heat sink spacers 210 and 212 (or the adjacent electrode thereof) of the two outside corona reactor cells 214 and 216, respectively. The other electrical lead 22 from the transformer 16 is applied to the two adjacent electrodes 218 and 220 of the two middle corona reactor cells 222 and 224, respectively, by connecting the lead line 22 from the transformer 16 to the spacers 228 and 230 connected to the electrodes 218 and 220 respectively. The operation of this embodiment of the present invention has characteristics of both the parallel and the series electrical circuits discussed above. The voltage to be applied to a corona reactor unit 14 having eight corona reactor cells, as shown in FIG. 11, will be approximately 20,000 to 50,000 volts peak.

FIG. 12 shows a completely parallel electrical arrangement in which a plurality of corona reactor cells 21 are connected in parallel. As stated above, the heat sink spacers 178 and 180 provide electrical connection between adjacent electrodes of adjacent cells. As shown in FIG. 12, the adjacent electrodes of adjacent cells have the same polarity and are electrically connected together. Electrical connection from the transformer 16 is made directly to the heat sink spacers 178 and 180. Although this parallel system is not a preferred electrical arrangement, for the reasons discussed above, it is one operable method of providing electrical connection to the corona reactor core 14.

Example

The preferred parameters for a typical run using the corona reactor 10 of the present invention to generate ozone are as follows.

The reactant was air.

The pressure in the individual corona reaction chambers was about 10 psi.

The power applied was 400 watts.

The flow rate was 1 CFM.

The number of corona reactor cells in the corona reactor core was eight.

The corona electrode gap (electrode spacing) was 60 mils.

The voltage was 12,000 volts peak for each cell.

The frequency was 60 Hz.

The ozone yield was 1 pound per day.

It is to be understood that the above description of the present invention has been made with reference to the preferred embodiments thereof and that the present invention is not limited thereto. For example, it is within the scope of certain aspects of this invention to use a plurality of tubes or other geometric shapes in place of the electrodes shown in the drawings, and such tubes and other shapes can also be stacked or sandwiched together in a modular array, for easy individual removal and insertion. Such tubes and other shapes can be connected in the series mode of the present invention. Further, other materials can be used than those specifically set forth above. Although the preferred use of the present invention is in the generation of ozone, it is to be understood that other reactants can be introduced into the corona reactor core 14 and subjected to a corona reaction to produce various reaction products as is known in the art.

Further, it is not necessary for each of the electrodes 152 and 154 to have a dielectric coating; one electrode can have a dielectric coating and the other electrode can be bare metal but with some sacrifice in ozone yield.

The invention has been described in detail with particular reference to preferred embodiments thereof, but it will be understood that variations and modifications can be effected within the spirit and scope of the invention as described hereinabove.

I claim:

1. A corona reactor comprising:
   a. a corona reactor core including:
      1. a plurality of adjacent, individual, spaced-apart, air-tight corona reactor cells,
      2. each of said cells including a pair of spaced-apart electrodes defining a corona discharge chamber between interior facing surfaces thereof,
      3. both of said interior having a uniform thin coating of dielectric material thereon, the total thickness of both of said coatings together being less than 40 mils,
      4. each of said electrodes having an exterior heat exchange surface exposed to a fluid coolant passageway,
      5. a plurality of spacer means, one each positioned between each cell and in contact with the exterior surface of each of the adjacent electrodes of the adjacent cells over a sufficiently large portion of the area thereof, for preventing said adjacent electrodes from bowing outwardly, and for maintaining said adjacent electrodes flat against higher pressure in said chamber than outside of said chamber,
      6. said electrodes one-piece, so thin that they would bow outwardly if not held flat by said spacer means, when the pressure in said chamber is greater than the pressure outside of said chamber, said spacer means including fluid coolant passageways therethrough,
      7. a continuous, one-piece, electrode spacer gasket of corona and ozone resistant material positioned between each pair of electrodes of each cell adjacent the peripheries of said electrodes for spacing said electrodes a predetermined distance apart for defining said chamber between said interior surfaces of said electrodes and interiorly of said spacer gasket, 8. means for sealing each pair of electrodes to the spacer gasket therebetween for sealing said chamber air-tight,
9. all surfaces in said chamber exposed to a corona discharge being non-metallic, and
10. means for feeding a fluid into and out of each of said chambers.

2. The apparatus according to claim 1 in which said plurality is at least two cells and wherein said at least two cells are electrically connected in series.

3. The apparatus according to claim 2 in which said plurality is more than two cells and wherein all of said plurality of individual corona reactor cells are electrically connected in series.

4. The apparatus according to claim 1 wherein said spacers are electrically conductive and provide electrical connection between adjacent electrodes of adjacent corona reactor cells.

5. The apparatus according to claim 1 including an inlet manifold and an outlet manifold for carrying a fluid into and out of said chambers, respectively, and wherein said feeding means includes an inlet conduit and an outlet conduit extending through at least one electrode of each pair of electrodes and means for connecting said inlet and outlet conduits to said inlet and outlet manifolds, respectively.

6. A corona reactor comprising:
a. a housing;
b. a corona reactor core mounted in said housing;
c. a transformer mounted in said housing;
d. an air blower mounted in said housing for blowing air through said corona reactor core;
e. said corona reactor core including a plurality of adjacent, individual, spaced-apart, air-tight corona reactor cells;
f. each of which cells includes a pair of spaced-apart electrodes defining a corona discharge chamber between interior facing surfaces thereof, a continuous, one-piece, electrode spacer gasket of corona and ozone resistant material positioned between each pair of electrodes of each cell adjacent the peripheries of said electrodes for spacing said electrodes a predetermined distance apart for defining said chamber between said interior surfaces of said electrodes and interiorly of said upper spacer gasket;
g. both of said interior surfaces having a thin, uniform coating thereon of dielectric material, with the total thickness of both coatings together being less than 40 mils;
h. each of said electrodes having an exterior heat exchange surface exposed to a fluid coolant passageway;
i. means for separately removing individual ones of said corona reactor cells from said core; and including
j. a plurality of spacer means, one each positioned between each cell and in contact with the exterior surface of each electrode over a sufficiently large portion of the area thereof for preventing said adjacent electrodes from bowing outwardly and for maintaining said adjacent electrodes flat against higher pressures in said chamber than outside of said chambers.

7. The apparatus according to claim 6 wherein said removing means includes a single quick connect-disconnect clamp removably holding all of said cells together.

8. The apparatus according to claim 6 wherein said individual corona reactor cells are electrically connected in series.

9. The apparatus according to claim 6 including a fluid conduit system for carrying fluid into, through, and out of said core, and a control panel on said housing having a first connector connected to an inlet conduit, a second connector connected to an outlet conduit, and a third connector connected to a sampling outlet conduit.

10. An individual corona reactor cell comprising:
a. a pair of spaced-apart electrodes;
b. a continuous, one-piece, spacer gasket of silicon rubber positioned between said pair of electrodes adjacent their peripheries for forming a corona reaction chamber between interior facing surfaces of said electrodes interiorly of said spacer gasket;
c. means for sealing said electrodes to said spacer gasket outside of said chamber for making said chamber air-tight;
d. both of said interior surfaces being coated with a thin layer of dielectric material, with the total thickness of both coatings together being less than 40 mils;
e. each of said electrodes having an exterior heat exchange surface; and
f. all surfaces in said chamber exposed to a corona discharge being non-metallic.

11. The apparatus according to claim 10 including fluid inlet and outlet means connected to said cell and providing fluid communication with said chamber, and including baffle means in said chamber preventing the creation of fluid "dead space".

12. The apparatus according to claim 10 wherein the entire peripheral edge of each of said electrodes flares outwardly away from said spacer gasket.

13. A corona reactor comprising:
a. a corona reactor core including:
1. a plurality of at least two individual air-tight corona reactor cells; and
2. at least two of said cells being connected electrically in series.

14. The apparatus according to claim 13 wherein all of said cells are connected electrically in series.

15. The apparatus according to claim 13 wherein said groups of said cells are connected electrically in parallel and the individual cells in each group are connected electrically in series.

16. The apparatus according to claim 1 wherein the entire peripheral edge of each of said electrodes is flared outwardly away from the adjacent spacer gasket for strengthening said electrodes, for aiding in preventing arcing therebetween at the edges thereof, and for providing a groove for said sealing means between said electrode and said spacer gasket.

17. The apparatus according to claim 16 wherein said sealing means is a continuous silicone sealant bead placed in the groove between said spacer gasket and said fluid edge.

18. The apparatus according to claim 1 wherein said spacer gasket is silicon rubber.

19. The apparatus according to claim 18 wherein all surfaces in said chamber exposed to a corona discharge consist of one of said dielectric coating material and said silicon rubber.

20. The apparatus according to claim 1 including a baffle in said chamber for preventing any fluid dead space.

21. The apparatus according to claim 1 wherein said electrodes are flat and parallel.

22. The apparatus according to claim 6 wherein said electrodes are flat and parallel.

* * * * *

UNITED STATES PATENT OFFICE
CERTIFICATE OF CORRECTION

Patent No. 3,798,457                    Dated March 19, 1974

Inventor(s) Frank E. Lowther

It is certified that error appears in the above-identified patent and that said Letters Patent are hereby corrected as shown below:

Claim 1(a) 3
line 42 after the word interior insert --facing surfaces--

Claim 1 (a) 6
line 58, delete "said electrodes one-piece, so thin that they would bow outwardly if not held flat by said spacer means, when the pressure in said chamber is greater than the pressure outside of said chamber,"

Claim 6 (f)
line 50, after the word said delete "upper"

Claim 17
line 65, change the word "fluid" to ---flared---.

Change the name of the Assignee from W.R. Grace & Co. to Purification Sciences, Inc.

Signed and sealed this 17th day of December 1974.

(SEAL)
Attest:

McCOY M. GIBSON JR.                    C. MARSHALL DANN
Attesting Officer                      Commissioner of Patents

UNITED STATES PATENT OFFICE
CERTIFICATE OF CORRECTION

Patent No. 3,798,457   Dated March 19, 1974

Inventor(s) Frank E. Lowther

It is certified that error appears in the above-identified patent and that said Letters Patent are hereby corrected as shown below:

Claim 15, line 1, after "said" insert---plurality of cells includes a plurality of groups of cells, and wherein said---.

Signed and sealed this 13th day of May 1975.

(SEAL)
Attest:

RUTH C. MASON
Attesting Officer

C. MARSHALL DANN
Commissioner of Patents
and Trademarks